W. H. BRISTOL.
MEASURING INSTRUMENT.
APPLICATION FILED MAY 2, 1918.
1,431,626.
Patented Oct. 10, 1922.
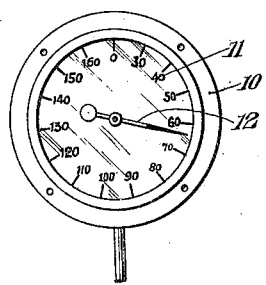
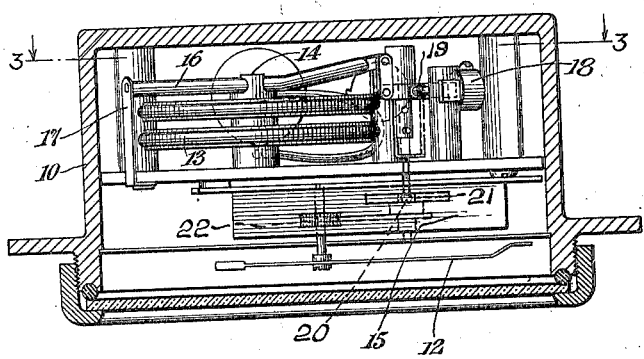
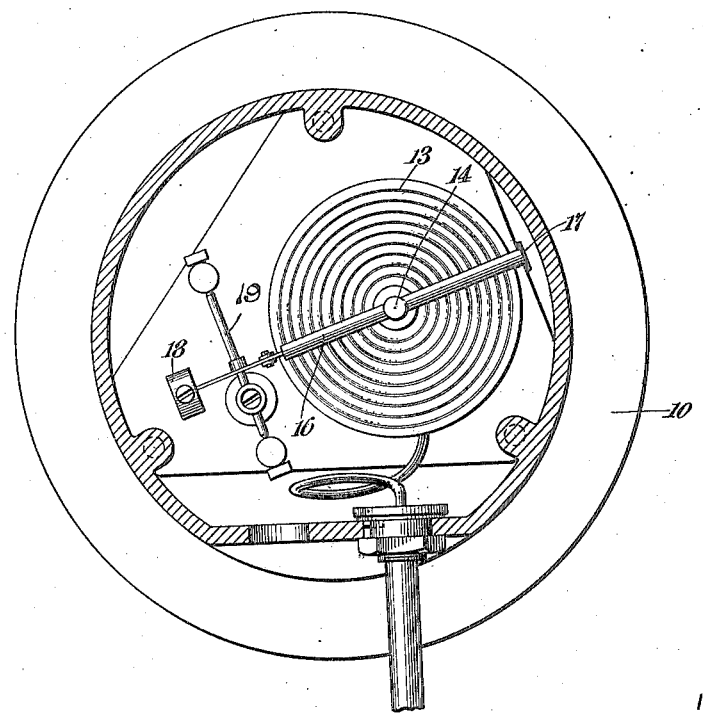
INVENTOR
William H. Bristol
BY
*[signature]*
ATTORNEY Patented Oct. 10, 1922.

1,431,626

UNITED STATES PATENT OFFICE.

WILLIAM H. BRISTOL, OF WATERBURY, CONNECTICUT.

MEASURING INSTRUMENT.

Application filed May 2, 1918. Serial No. 231,986.

*To all whom it may concern:*

Be it known that I, WILLIAM H. BRISTOL, a citizen of the United States, and a resident of Waterbury, in the county of New Haven and State of Connecticut, have invented certain new and useful Improvements in Measuring Instruments, of which the following is a specification.

The invention relates to improvements in instruments for measuring variations in pressure, for example, instruments of the type set forth in a prior Patent, No. 839,981, granted me the first day of January, 1907. In this patent, an instrument is set forth comprising an expansible chamber, consisting of a plurality of flexible, circular diaphragms, whose motion in the direction of its longitudinal axis, due to expansion and contraction of said diaphragms, is converted into a deflection by a plurality of yieldable means, such as two flat springs, the faces of which lie in a common plane at right angles to the plane of deflection of the said longitudinal axis of the expansible chamber.

In the present invention, there is embodied a more substantial and simplified form of this type of instrument, and a more compact device is afforded, rendering the same particularly suitable for use in connection with airplanes, where an economy of space and weight is essential. To this end, but a single yielding means is employed, and the same is so located as to insure a definite direction of deflection and without lag, the said means lying in the plane of deflection of the longitudinal axis of the expansible chamber. While this construction may reduce somewhat the direct deflection of the device, yet this slight sacrifice is more than offset by the advantages enumerated hereinbefore.

The nature of the invention will be best understood when described in connection with the accompanying drawings, in which—

Fig. 1 is a front elevation of the improved pressure gage.

Fig. 2 is a horizontal section through the instrument casing, the mechanism being shown in full.

Fig. 3 is a section taken on the line 3—3, Fig. 2, looking in the direction of the arrows.

Similar characters of reference designate corresponding parts throughout the several views.

Referring to the drawings, 10 designates a suitable casing for retaining the actuating mechanism, and carries a dial or record sheet 11 for a pointer or measuring arm 12 which is designed to move over same and effect an indication or record, as is well understood.

The mechanism for actuating the measuring arm 12 comprises an expansible chamber 13 secured at one end to the casing and made up of a series of perforated, superposed, circular disks, for example of the character set forth in my prior patent hereinbefore referred to, the said chamber being designed to receive the fluid whose variation in pressure it is desired to measure. The measuring arm 12 may be attached directly to the outer of these disks or diaphragms and free end of the chamber, or preferably to a rigid portion 14 thereof, substantially in the longitudinal axis of the said chamber, and along which axis the chamber is designed to expand and contract under the influence of the pressure variations of the fluid introduced therein.

It is desirable, however, to include suitable multiplying mechanism, hereinafter described, and retained within a container 15. To this end, and to cause the desired deflection of the arm 12, a rod or bar 16 is rigidly connected to said portion 14, extending in one direction to a portion of the multiplying mechanism, and in the other radially over and beyond the said series of diaphragms. To this latter projecting end, there is secured one end of a flexible restraining means, such as a flat spring 17 whose other end is fixed to a plate attached to the casing 10. The purpose of this restraining means is to convert the longitudinal movement of the expansible chamber, due to introduction of fluid therein, into a deflection of said chamber, which deflection will be communicated to the measuring arm through the rod 16 rigidly secured to portion 14 of said chamber and the intermediate multiplying mechanism. A counterweight 18 may be included in the intermediate mechanism, as shown, in order to render the instrument suitable for use in any position. Movement of rod 16 is communicated to a rock shaft 19 and the latter is connected with a ball shaft 20 operating in a cam slot 21 to transmit the movement to the pointer 12 through the intermediate gearing 22. The flat strip 17 is so located with reference to the series of diaphragms forming the pressure chamber that the same is entirely free and clear of said disks, except for the connection, aforesaid, through the said rod; and to insure a definite direction of deflection, the plane of its face is perpendicular to a radius of the disks, or rather to the plane of deflection of the longitudinal axis of the disks. The use of a flat spring in this manner greatly simplifies the construction, materially reduces the size and thereby weight of the device, and accurately determines the direction of deflection, and is quite sufficient to insure against any lag in the action of the diaphragms.

I claim:

1. In a pressure gage: a casing; a series of perforated, superposed circular disks forming an expansible chamber secured at one end to said casing and the outer disk of the other end of said series being provided with a rigid portion substantially in its longitudinal axis, said disks forming a chamber adapted to expand and contract in the direction of its longitudinal axis in accordance with variations of pressure of fluid introduced therein; indicating means actuated from said rigid portion; and flexible restraining means rigidly secured at one end to the casing, and means connecting the other end thereof with said rigid portion of the upper disk, said restraining means being otherwise entirely free and clear of the said disks and being yieldable only in the plane of deflection of the longitudinal axis of said chamber, to restrain the motion of the chamber and convert the same into a deflection of its said longitudinal axis.

2. In a pressure gage: a casing; a series of perforated, superposed, circular disks forming an expansible chamber secured at one end to said casing and the outer disk of the other end of said series being provided with a rigid portion substantially in its longitudinal axis, said disks forming a chamber adapted to expand and contract in the direction of its longitudinal axis in accordance with variations of pressure of fluid introduced therein; indicating means actuated from said rigid portion; and a flat strip rigidly secured at one end to the casing, and means connecting the other end thereof with said rigid portion of the upper disk, said strip being otherwise entirely free and clear of the said disks and lying in a plane at right angles to the plane of deflection of the longitudinal axis of said chamber and being yieldable only in the plane of deflection of the longitudinal axis of said chamber, to restrain the motion of the chamber and convert the same into a deflection of its said longitudinal axis.

Signed at New York, in the county of New York and State of New York, this 26th day of April, A. D. 1918.

WILLIAM H. BRISTOL.